US007039525B2

(12) United States Patent
Mittet

(10) Patent No.: US 7,039,525 B2
(45) Date of Patent: May 2, 2006

(54) METHOD FOR SEISMIC MIGRATION USING EXPLICIT DEPTH EXTRAPOLATION OPERATORS WITH DYNAMICALLY VARIABLE OPERATOR LENGTH

(75) Inventor: Rune Mittet, Trondheim (NO)

(73) Assignee: PGS Geophysical AS, Lysaker (NO)

( * ) Notice: Subject to any disclaimer, the term of this patent is extended or adjusted under 35 U.S.C. 154(b) by 86 days.

(21) Appl. No.: 10/668,909

(22) Filed: Sep. 23, 2003

(65) Prior Publication Data

US 2005/0065731 A1  Mar. 24, 2005

(51) Int. Cl.
  *G01N 15/08* (2006.01)
(52) U.S. Cl. ............................................. 702/13; 703/5
(58) Field of Classification Search .............. 702/1–16, 702/17–18; 367/44, 53, 50, 63, 38, 47, 56; 703/5, 10
See application file for complete search history.

(56) References Cited

U.S. PATENT DOCUMENTS

| | | | | |
|---|---|---|---|---|
| 3,280,936 A | * | 10/1966 | Mayne | 367/56 |
| 3,611,278 A | * | 10/1971 | Guinzy et al. | 367/63 |
| 3,622,965 A | * | 11/1971 | Wu | 367/47 |
| 4,110,729 A | * | 8/1978 | Vreugde | 367/63 |
| 4,611,312 A | * | 9/1986 | Ikeda | 367/38 |
| 4,628,492 A | * | 12/1986 | Winney | 367/63 |
| 4,766,574 A | * | 8/1988 | Whitmore et al. | 367/50 |
| 5,235,555 A | * | 8/1993 | Albertin | 367/53 |
| 5,394,325 A | * | 2/1995 | Schneider, Jr. | 702/18 |
| 5,583,826 A | * | 12/1996 | Soubaras | 367/44 |
| 6,295,505 B1 | * | 9/2001 | Assa et al. | 702/17 |
| 6,519,532 B1 | * | 2/2003 | Meng | 702/17 |
| 2002/0103602 A1 | * | 8/2002 | Meng | 702/14 |

FOREIGN PATENT DOCUMENTS

RU     2169381     2/2000

OTHER PUBLICATIONS

G. Blacquiére, H.W.J. Debeye, C.P.A. Wapenaar, A.J. Berkhout, "3-D table-driven migration", Geophysical Prospecting, 1989, pp. 925-958, vol. 37.
Dave Hale, "3-D depth migration via McClellan transformations", Geophysics, Nov. 1991, pp. 1778-1785, vol. 56, No. 11.

(Continued)

*Primary Examiner*—John Barlow
*Assistant Examiner*—Victor J. Taylor
(74) *Attorney, Agent, or Firm*—E. Eugene Thigpen; Charles R. Schweppe

(57) ABSTRACT

Explicit depth extrapolation operators are constructed with variable operator lengths depending on maximum dip angle, accuracy condition, and wavenumber. Operator tables are then constructed using the explicit depth extrapolation operators. In a further embodiment, depth migration is performed using the explicit depth extrapolation operators from the operator tables.

15 Claims, 4 Drawing Sheets

OTHER PUBLICATIONS

O. Holbert, "Towards optimum one-way wave propagation", Geophysical Prospecting, Feb. 1988, pp. 99-114, vol. 36, No. 2.

Rune Mittet, "Explicit 3D depth migration with a constrained operator", SEG International Exposition and 72$^{nd}$ Annual Meeting, Oct. 2002, four pages.

A. Sollid, B. Arnsten, "Cost effective 3D one-pass depth migration", Geophysical Prospecting, Oct. 1994, pp. 755-776, vol. 42, No. 7.

Robert Soubaras, "Explicit 3-D Migration Using Equiripple Polynomial Expansion and Laplacian Synthesis", 62$^{nd}$ Annual Meeting, Society of Exploration Geophysicists, Expanded Abstracts, Oct. 1992, pp. 905-908.

Robert Soubaras, "Explicit 3-D Migration Using Equiripple Polynomial Expansion and Laplcian Synthesis", Geophysics, Sep.-Oct. 1996, pp. 1386-1393, vol. 61, No. 5.

* cited by examiner

METHOD FOR SEISMIC MIGRATION USING EXPLICIT DEPTH EXTRAPOLATION OPERATORS WITH DYNAMICALLY VARIABLE OPERATOR LENGTH

CROSS-REFERENCES TO RELATED APPLICATIONS

Not Applicable

FEDERALLY SPONSOR RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of seismic data processing. Specifically, the invention is a method for seismic migration using explicit depth extrapolation operators with dynamically variable operator length.

2. Description of the Related Art

The use of three-dimensional (3D) seismic methods has resulted in increased drilling success in the oil and gas industry. However, 3D seismic methods are still computationally expensive. A crucial point in processing 3D seismic data is the migration step, both because of its 3D nature and the computational cost involved. The accuracy, stability, and efficiency of 3D migration are determined by the wavefield extrapolation technique employed. Thus, it is desirable that the algorithms employed in 3D migration be accurate, stable, and efficient themselves, especially when 3D prestack migration is considered.

A number of the algorithms used in two-dimensional (2D) depth migration have not been successful in the 3D case. For example, implicit finite-difference extrapolation methods have the advantage of being unconditionally stable, but the disadvantage of being difficult to extend to the 3D case. The most common 3D implicit method is based on the operator splitting into alternating direction components. The splitting errors that these methods exhibit in the 3D case are translated into non-circularly symmetric impulse responses, which become unacceptable for dips higher than 45°. The splitting methods have errors that depend significantly on reflector dip and azimuth and thus have problems with reflector positioning errors. Similarly, two-pass methods have problems handling lateral velocity variations.

In contrast, explicit extrapolation methods that approximate the extrapolation operator as a finite-length spatial filter are easily extended to the 3D case. The difficulty with explicit extrapolation is that the stability condition is not automatically fulfilled. The stability condition is that no amplitude at any frequency will grow exponentially with depth. Stability must be guaranteed by careful design of the extrapolation operators.

Three-dimensional seismic wavefields may be extrapolated in depth, one frequency at a time, by two-dimensional convolution with a circularly symmetric, frequency- and velocity-dependent operator. This depth extrapolation, performed for each frequency independently, lies at the heart of 3D finite difference depth migration. The computational efficiency of 3D depth migration depends directly on the efficiency of this depth extrapolation. For these techniques to yield reliable and interpretable results, the underlying wavefield extrapolation must propagate the waves through inhomogeneous media with a minimum of numerically induced distortion over a range of frequencies and angles of propagation.

Holberg, O., "Towards optimum one-way wave propagation", Geophysical Prospecting, Vol. 36, 1988, pp. 99–114, first disclosed explicit depth extrapolation with optimized operators. Holberg proposes a technique, solely for 2D depth migration, by generalizing conventional finite-difference expressions in the frequency-space domain. This technique yields optimized spatial symmetric convolutional operators, whose coefficients can be pre-computed before migration and made accessible in tables. The ratio between the temporal frequency and the local velocity is used to determine the correct operator at each grid point during the downward continuation, by fitting their spatial frequency response to the desired phase shift response over a range of frequencies and angles of propagation to control numerical distortion. Holberg's technique can be made to handle lateral velocity variations. However, the method only applies to 2D migration.

Blacquiere, G., Debeye, H. W. J, Wapenaar, C. P. A., and Berkhout, A. J, "3-D table driven migration", Geophysical Prospecting, Vol. 37, 1989, pp. 925–958, extended the method disclosed in Holberg (1988) to 3D migration. The wavefield extrapolation is performed in the space-frequency domain as a space-dependent spatial convolution with recursive Kirchhoff extrapolation operators based on phase shift operators. The optimized operators are pre-calculated and stored in a table for a range of wavenumbers. The extrapolation is performed recursively in the space domain, so both vertical and lateral velocity variations can be handled. The Blacquiere et al. method is accurate, but is a full 3D method and hence computationally expensive.

Hale, D., "3-D depth migration via McClellan transformations", Geophysics, Vol. 56, No. 11 (November, 1991), pp. 1778–1785, introduced a more efficient 3D scheme based on the McClellan transform, which gives numerically isotropic extrapolation operators. This commonly referred to as the Hale-McClellan scheme. Given the coefficients of one-dimensional frequency- and velocity-dependent filters similar to those used to accomplish 2D depth migration, McClellan transformations lead to an algorithm for 3D depth migration. Because the coefficients of two-dimensional depth extrapolation filters are never explicitly computed or stored, only the coefficients of the corresponding one-dimensional filters are required. Applying the two-dimensional extrapolation filter increases only linearly with the number of coefficients N in the corresponding one-dimensional filter, whereas the cost of convolution with a two-dimensional filter is generally proportional to $N^2$. However, Hale's method has numerical anisotropy.

Two Soubaras publications: Soubaras, R, "Explicit 3-D migration using equiripple polynomial expansion and Laplacian synthesis", $62^{nd}$ Ann., Internat. Mtg., Soc. Expl. Geophys., Expanded Abstracts, 1992, pp. 905–908, and Soubaras, R., "Explicit 3-D migration using equiripple polynomial expansion and Laplacian synthesis", Geophysics, Vol. 61, No. 5 (September–October, 1996), pp. 1386–1393, improved the Hale-McClellan scheme. The Soubaras (1992, 1996) method used an expansion in second-order differential operators instead of the McClellan transform. Soubaras (1992, 1996) method also uses the Remez algorithm to design the coefficients for both the extrapolation operator and for the differential operators. This method avoids the numerical anisotropy to a large degree and is comparable in computational cost to the Hale-McClellan scheme.

The Soubaras approach takes advantage of operator circular symmetry, as do the McClellan transformations, but avoids the computation of a 2D filter approximating the cosine of the wavenumbers. The approach defines a Laplacian operator, approximates the Laplacian by the sum of two 1D filters approximating the second derivatives, and approximates the exact extrapolation operator by a polynomial. The second derivative operators and the polynomial expansion are both calculated by the Remez exchange algorithm.

Sollid, A., and Arntsen, B., "Cost effective 3D one-pass depth migration", *Geophysical Prospecting* Vol. 42, 1994, pp. 755–716, makes the Soubaras (1992, 1996) scheme more cost effective. Sollid and Arntsen (1994) used frequency adaptive optimized derivative operators. The expansion in second order differential operators is used, but the expansion coefficients and differential operators are designed using a least squares approach rather than the Remez algorithm. A set of variable length second order differential operators for each wavenumber has different spectra and lengths to ensure that the resulting wave extrapolation is both accurate and efficient.

Mittet, R., 2002, "Explicit 3D depth migration with a constrained operator", in 72nd Ann. Internat. Mtg., Soc. Expl. Geophys., Expanded Abstracts, pp. 1148–1151, discloses a constrained explicit operator method which is a modification of the full 3D scheme discussed in Blacquiere et al. (1989), above, to make the scheme more computationally efficient. The number of independent operator coefficients is constrained to reduce the number of computer floating point operations required, thus increasing computer efficiency. The innermost coefficients in the core area of the extrapolation operator are computed in a standard fashion. The remaining outermost coefficients in the operator, related to very high dip and evanescent wave propagation, change only as a function of radius and are constant within radial intervals.

Thus, a need exists for an explicit depth extrapolation method for 2D and 3D seismic migration that is accurate, stable, and efficient.

BRIEF SUMMARY OF THE INVENTION

The invention is a method for seismic migration using explicit depth extrapolation operators with dynamically variable operator length. Explicit depth extrapolation operators are constructed with variable operator lengths depending on maximum dip angle, accuracy condition, and wavenumber. Operator tables are then constructed using the explicit depth extrapolation operators. In a further embodiment, depth migration is performed using the explicit depth extrapolation operators from the operator tables.

BRIEF DESCRIPTION OF THE DRAWINGS

The invention and its advantages may be more easily understood by reference to the following detailed description and the attached drawings, in which.

Figure 1:
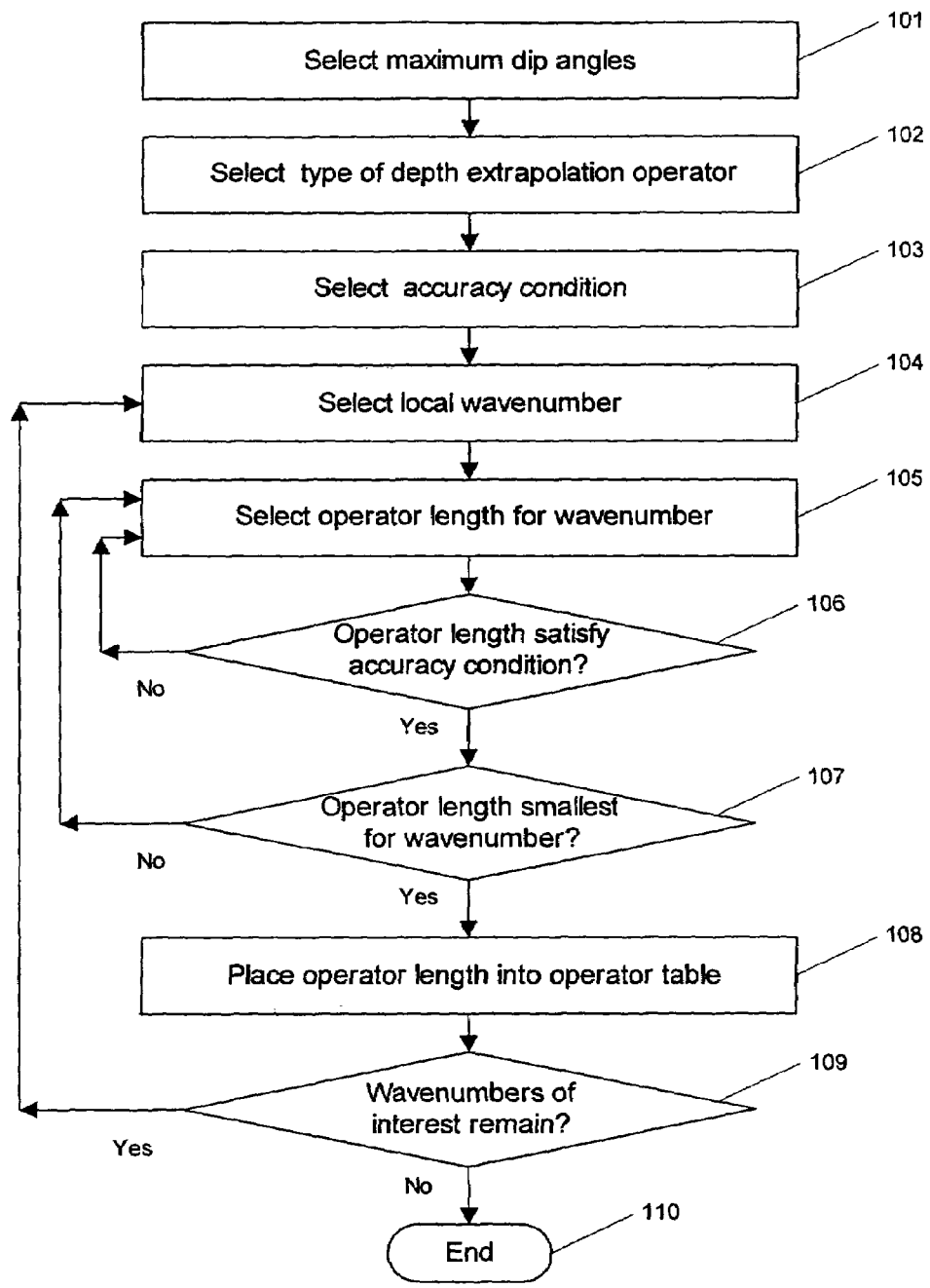
FIG. 1 is a flowchart illustrating the processing steps of a first embodiment of the method of the invention for constructing explicit depth extrapolation operators with dynamically variable operator length.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for seismic migration using explicit depth extrapolation operators with dynamically variable operator length. The method of the invention is applicable to the methods disclosed in the publications described above and any methods derived from or similar to the methods disclosed in these publications.

Downward wavefield extrapolation transforms a seismic wavefield $P(x, y, \omega, z)$ at lateral location x, y and depth level z to the seismic wavefield $P(x, y, \omega, z+\Delta z)$ at depth level $z+\Delta z$ by convolving $P(x, y, \omega, z)$ with an extrapolation operator $W(x, y, k_\omega(x, y, z), \Delta z)$. The seismic wavefield $P(x, y, \omega, z)$ is in the space-frequency domain, having been transformed from the space-time domain, if necessary, by a temporal Fourier transform. Here, x and y are the horizontal spatial coordinates, typically in the in-line and cross-line directions, respectively, of the seismic survey that collected the data. The interval $\Delta z$ is a spatial sampling interval or step length in the vertical z-coordinate direction, where depth z is measured positive downwards. A local wavenumber $k_\omega(x, y, z)$ is defined by:

$$k_\omega(x, y, z) = \frac{\omega}{c(x, y, z)}, \qquad (1)$$

where $\omega = 2\pi f$ is the angular frequency for frequency f and $c(x, y, z)$ is the local propagation velocity of the medium at the spatial location $(x, y, z)$. Thus, explicit depth extrapolation can be expressed in the space-frequency domain by the following two-dimensional spatial convolution along the horizontal x- and y-coordinates:

$$\begin{aligned}P(x, y, \omega, z + \Delta z) &= W(x, y, k_\omega, \Delta z) * P(x, y, \omega, z) \\ &= \int\int W(x', y', k_\omega, \Delta z) P(x-x', y-y', \omega, z) dx'dy',\end{aligned} \qquad (2)$$

The extrapolation given in Equation (2) is applied recursively downward for all depth levels z of interest. One method for varying the velocity in the vertical direction is to assign different velocities in each depth level z. Additionally, the velocity can vary laterally in the x- and y-coordinate directions at each depth level z.

The extrapolation operator $W(x, y, k_\omega(x, y, z), \Delta z)$ in Equation (2) is an approximation of the inverse spatial Fourier transform of the exact extrapolation operator $D(k_x, k_y, k_\omega, \Delta z)$ for explicit depth extrapolation. The exact extrapolation operator $D(k_x, k_y, k_\omega, \Delta z)$ is given in the frequency-wavenumber domain by the phase shift operator:

$$D(k_x, k_y, k_\omega, \Delta z) = \exp(i\Delta z\sqrt{k_\omega^2 - k_x^2 - k_y^2}), \qquad (3)$$

where $k_x$ and $k_y$ are horizontal wavenumbers in the x- and y-coordinates, respectively. Strictly speaking, the phase shift operator is only valid for homogeneous media, that is, media with no velocity variation. The inverse spatial Fourier transform of the phase shift operator in Equation (2) yields a Rayleigh operator in the space-frequency domain, which, however, must be band limited and truncated to be useful. As a practical alternative, the explicit extrapolation operator is typically approximated in the space-frequency domain. Thus, the goal of explicit depth extrapolation is constructing an explicit extrapolation operator $W(x, y, k_\omega(x, y, z), \Delta z)$ that is simultaneously accurate, stable, and efficient.

Constructing an explicit extrapolation operator $W(x, y, k_\omega(x, y, z), \Delta z)$ that is accurate means that the Fourier transform $W(k_x, k_y, k_\omega, \Delta z)$ approximates the exact extrapolation operator $D(k_x, k_y, k_\omega, \Delta z)$ given by Equation (3) closely. Thus, the difference between the operators $D(k_x, k_y, k_\omega, \Delta z)$ and $W(k_x, k_y, k_\omega, \Delta z)$ should be a minimum for a given frequency $\omega$ and velocity $c(x, y, z)$, that is, for a given $k_\omega(x, y, z)$. The difference between the operators $D(k_x, k_y, k_\omega, \Delta z)$ and $W(k_x, k_y, k_\omega, \Delta_z)$ is measured in some appropriate norm in the frequency-wavenumber domain and over an appropriate range of wavenumbers, called the propagation or passband region of the operator. The passband region is typically defined as all wavenumbers less than cutoff wavenumbers $k_c(\theta_{x,max})$ and $k_c(\theta_{y,max})$ given by:

$$k_c(\theta_{x,\max}) = \frac{\omega \cdot \sin\theta_{x,\max}}{c(x, y, z)}, k_c(\theta_{y,\max}) = \frac{\omega \cdot \sin\theta_{y,\max}}{c(x, y, z)}, \quad (4)$$

where $\theta_{x,max}$ and $\theta_{y,max}$ are the maximum dip angles selected to be accurately migrated in the x-coordinate and y-coordinate directions, respectively. Note that if $\theta_{x,max}=\theta_{y,max}$, then $k_c(\theta_{x,max})=k_c(\theta_{y,max})$. Thus, the explicit extrapolation operator satisfies the following accuracy condition in the wavenumber passband region:

$$\|D(k_x, k_y, k_\omega, \Delta z) - W(k_x, k_y, k_\omega, \Delta z)\| = \text{minimum, for}$$
$$0 \leq k_x < k_c(\theta_{x,max}) \text{ and } 0 \leq k_y < k_c(\theta_{y,max}), \quad (5)$$

where $\| \|$ represents an appropriate norm in the frequency-wavenumber domain. The cutoff wavenumbers $k_c(\theta_{x,max})$ and $k_c(\theta_{y,max})$ determine the maximum dip angle accuracy of the explicit extrapolation operator.

Constructing an explicit extrapolation operator $W(x, y, k_\omega(x, y, z), \Delta z)$ that is stable means that the absolute value of the magnitude of the wavenumber response $W(k_x, k_y, k_\omega, \Delta z)$ is as close as possible to unity over the wavenumber passband region and is either contained or suppressed for angles of propagation higher than the maximum design dip angle and in the evanescent region. This latter range of wavenumbers is called the stopband region of the operator. The stopband region is usually defined as all wavenumbers greater than or equal to the cutoff wavenumber and less than or equal to the Nyquist wavenumbers $k_{x,Nyq}, k_{y,Nyq}$ given by:

$$k_{x,Nyq} = \frac{\pi}{\Delta x}, k_{y,Nyq} = \frac{\pi}{\Delta y}, \quad (6)$$

where $\Delta x$ and $\Delta y$ are spatial sampling intervals or step lengths in the horizontal x- and y-coordinate directions, respectively. Note that if $\Delta x = \Delta y$, then $k_{x,Nyq} = k_{y,Nyq}$. Thus, the explicit extrapolation operator satisfies the following stability condition in the wavenumber passband region:

$$\|W(k_x, k_y, k_\omega, \Delta z)\| = 1, \text{ for } 0 \leq k_x < k_c(\theta_{x,max}) \text{ and}$$
$$0 \leq k_y < k_c(\theta_{y,max}), \quad (7)$$

and the following stability condition in the wavenumber stopband region:

$$\|W(k_x, k_y, k_\omega, \Delta z)\| < 1, \text{ for } k_c(\theta_{x,max}) \leq k_x \leq k_{x,Nyq} \text{ and}$$
$$k_c(\theta_{y,max}) \leq k_y \leq k_{y,Nyq} \quad (8)$$

It is important that the response is stable, since the explicit extrapolation operator will be applied recursively.

Constructing an explicit extrapolation operator $W(x, y, k_\omega(x, y, z), \Delta z)$ that is efficient means that applying the operator W in a migration scheme is computationally inexpensive. For computational efficiency, a discrete version of Equation (2) is needed. Let i, j, l, and m be integers and let $\Delta x$, $\Delta y$, and $\Delta z$ be step lengths in the x-, y- and z-coordinate directions, respectively, as defined above. Then, lateral locations can be defined discretely by $x_i = i \cdot \Delta x$ and $y_j = j \cdot \Delta y$. Discrete downward extrapolation transforms a discrete representation of the wavefield $P(x_i, y_j, \omega, z)$ at lateral location $x_i, y_j$ and depth level z to the wavefield $P(x_i, y_j, \omega, z+\Delta z)$ at depth level $z+\Delta z$, by convolving with a discrete extrapolation operator $W(x_i, y_j, k_\omega(x_i, y_j, z), \Delta z)$. The discrete wavenumber $k_\omega(x_i, y_j, z)$ is then given by replacing Equation (1) by the following discrete version:

$$k_\omega(x_i, y_j, z) = \frac{\omega}{c(x_i, y_j, z)}, \quad (9)$$

Analogous to the second equality in Equation (2), a discrete version of explicit depth extrapolation can be expressed in three dimensions by $$P(x_i, y_j, \omega, z + \Delta z) = \quad (10)$$
$$\sum_{l=-L}^{L} \sum_{m=-M}^{M} W(x_l, y_m, k_\omega(x_i, y_j, z), \Delta z) P(x_i - x_l, y_j - y_m, \omega, z),$$

where L and M are called the half-lengths of the operator W in the x- and y-directions, respectively. The integers L and M are called operator half-lengths since the number of coefficients in the extrapolation operator W is (2L+1)(2M+1). For reference, the 3D version of Equation (10) reduces in a straightforward manner to a 2D version given by:

$$P(x_i, \omega, z + \Delta z) = \sum_{l=-L}^{L} W(x_l, k_\omega(x_i, z), \Delta z) P(x_i - x_l, \omega, z). \quad (11)$$

Note that the operator half-lengths, L and M, in Equations (10) and (11) determine the operator length, or size, of the explicit extrapolation operator W, and thus the efficiency of the extrapolation method. In principle, the operator half-lengths would be infinite for exactness. In practice, these operator half-lengths must be finite for computer implementation. In particular, these operator half-lengths should be minimized for increased computer efficiency. As will be described below with reference to the present invention, the operator half-lengths can be made to depend optimally on the maximum wavenumber, $k_\omega(x_i, y_j, z)$, at a given depth level z or in a sub-domain D within that depth level z.

Holberg (1988) determines the coefficients of the transformed extrapolation operator W for the 2D case corresponding to Equation (11). However, this method is only 2D. Blacquiere et al. (1989) extends the method to the 3D case corresponding to Equation (10). However, this method is still computationally expensive. Hale (1991) introduces a more efficient scheme based on McClellan transforms to calculate the coefficients of the extrapolation operator W. However, this method has numerical anisotropy. Soubaras (1992, 1996) introduces an improved method using second-order differential operators instead of McClellan transforms. However, this method still has numerical anisotropy. Sollid, A., and Arntsen, B. (1994) use frequency adaptive optimized derivative operators to improve the computational efficiency of the Soubaras method.

The methods for applying an extrapolation operator according to the Hale-McClellan approach, as discussed above for Hale (1991), Soubaras (1992, 1996), and Sollid, A., and Arntsen, B. (1994) are two stage algorithms. First, recursive 2D Chebyshev filters are applied to the wave field $P(x_i, y_j, \omega, z)$ at depth level z, resulting in auxiliary fields $h_l(x_i, y_j, \omega, z)$. Second, the pressure at the downward extrapolated depth $z+\Delta z$ is expressed by:

$$P(x_i, y_j, \omega, z + \Delta z) = \sum_{l=0}^{L} W_l(k_\omega(x_i, y_j, z), \Delta z) h_l(x_i, y_j, \omega, z) \quad (12)$$

where $W_l(k_\omega(x_i, y_j, z), \Delta z)$ is an extrapolation operator now expressed in cylindrical coordinates. For all the above mentioned types of schemes, the extrapolation coefficients must be designed for a sequence of wavenumber $k_\omega$ values, which range from 0 to the Nyquist wavenumber, which is given by the maximum Nyquist wavenumber from Equation (6) or given by $\pi$, if in normalized coordinates. The present invention shows for these types of extrapolation schemes that the operator half-length L can be made to depend optimally on the maximum wavenumber $k_\omega$, at a given depth level z or in a sub-domain D within that depth level z. This optimization yields increased computational efficiency. This computational efficiency is further increased with the constrained operator approach discussed above for Mittet, R., (2002).

A standard procedure is to set the operator half-length to a constant for all wavenumbers $k_\omega$. A commonly recognized fact is that when the maximum design angle is increased, the operator half-length must also be increased, if the numerical accuracy is kept fixed. Therefore, where a maximum dip angle of 55 degrees may require an operator half-length of 8, a maximum dip angle of 70 may require an operator half length of 16. Increasing the operator half-length with a factor of 2 in this case, for a full 3D operator, increase the numerical work with a factor of more than 4. For example, extrapolation operator half-lengths of 3, 5, and 12 are often associated with 30-, 50-, and 70-degree dip angle accuracies, respectively.

There is, however, another fact that is not recognized and exploited. For a given maximum dip angle, keeping numerical accuracy fixed, the required operator half length varies with the wavenumber $k_\omega$. The dependency is such that the operator half length must be increased with increased $k_\omega$. Thus, the numerical workload of depth extrapolation can be significantly reduced by constructing operator tables with variable operator half lengths.

There are several ways to obtain such operator tables. A first way to obtain the tables is directly in the operator optimization software. For each wavenumber $k_\omega$, the strategy is to start with too low a value of the half-lengths $L(k_\omega)$ and $M(k_\omega)$, for the 3D case, or just the half-length $L(k_\omega)$, for the 2D case. Then the value of each half-length is increased with steps of 1 until proper convergence is achieved. This strategy is illustrated in FIG. 1, which shows a flowchart illustrating the processing steps of a first embodiment of the method of the invention for constructing tables of explicit depth extrapolation operators with dynamically variable operator length.

At step 101, a maximum dip angle to be accurately migrated is selected. Alternatively, maximum dip angles to be accurately migrated are selected in both the x-coordinate and y-coordinate directions. Typically, the x-coordinate and y-coordinate directions are the in-line and cross-line directions, respectively, of a seismic survey used to collect seismic data. Alternatively, maximum dip angles in all directions are selected.

At step 102, a type of explicit extrapolation operator for depth migration is selected. By way of example, but not of limitation, the method of the invention is applicable to the explicit extrapolation operators disclosed in the publications described above and any operators derived from or similar to the operators disclosed in these publications. Thus, for example, 3D explicit depth extrapolation can be implemented with Equation (10) and 2D explicit depth extrapolation can be implemented with Equation (11).

At step 103, accuracy conditions are selected for the maximum dip angles selected in step 101 and the type of explicit depth extrapolation operator selected in step 102. The accuracy conditions are selected to determine if the operator half-lengths, which determine the size of the explicit depth extrapolation operators, are sufficiently large. For example, the accuracy conditions could include the requirement that the explicit extrapolation operator selected satisfy the accuracy condition in the wavenumber passband region given in Equation (5), above. Including this accuracy condition would require calculating cutoff wavenumbers $k_c(\theta_{x,max})$ and $k_c(\theta_{y,max})$, as given by Equation (4), to define the passband region. The cutoff wavenumbers depend upon the maximum dip angles $\theta_{x,max}$ and $\theta_{y,max}$, in the x-coordinate and y-coordinate directions, respectively, selected in step 101.

At step 104, a wavenumber $k_\omega$ is selected. The selection of the wavenumber $k_\omega$ is preferably done in a systematic manner, for computational efficiency, although systematic selection of the wavenumber $k_\omega$ is not a requirement of the invention. For example, a range of wavenumbers $k_\omega$ can be taken as going from a lowest wavenumber of interest, such as zero, to a highest wavenumber of interest, such as a Nyquist wavenumber. Then, the selection of the wavenumbers $k_\omega$ can start with the lowest wavenumber of interest and proceed sequentially to the highest wavenumber of interest, or, inversely, proceed sequentially from the highest wavenumber of interest to the lowest wavenumber of interest.

At step 105, an operator length is selected for the wavenumber $k_\omega$ selected in step 104. The operator length is preferably selected in a systematic manner, for computational efficiency, although systematic selection of the operator lengths is not a requirement of the invention. For example, the selection of the operator lengths can start with a low operator half-length and proceed sequentially upward by 1.

For the 2D case, as illustrated in Equation (11), the operator length is determined by operator half-length L. Thus, an operator half-length $L(k_\omega)$ in the x-direction is preferably selected for the wavenumber $k_\omega$ selected in step 105. For the 3D case, as illustrated in Equation (10), the total operator length is determined by both operator half-lengths L and M. Thus an operator half-length $L(k_\omega)$ in the x-direction and an operator half-length $M(k_\omega)$ in the y-direction are preferably selected for the wavenumber $k_\omega$ selected in step 105.

At step 106, it is determined if the type of operator selected in step 102 with the operator length selected in step 105 satisfies the accuracy conditions selected in step 103 for the maximum dip angles selected in step 101. For the 2D case, the operator length is preferably given by an operator half-length $L(k_\omega)$ and for the 3D case, the operator length is preferably given by the pair of operator half-lengths $L(k_\omega)$ and $M(k_\omega)$. If the answer is no, the accuracy conditions are not satisfied, then the process returns to step 106 to select another operator length. If the answer is yes, the accuracy conditions are satisfied, then the process continues to step 108.

At step 107, it is determined if the operator length selected in step 105 is the smallest operator length satisfying the accuracy conditions for the wavenumber $k_\omega$ selected in step 104. For the 2D case, the operator length is preferably given by an operator half-length $L(k_\omega)$ and for the 3D case, the operator length is preferably given by the pair of operator half-lengths $L(k_\omega)$ and $M(k_\omega)$. If the answer is no, the operator length is not the smallest satisfying the accuracy conditions, then the process returns to step 105 to select another operator length. If the answer is yes, the operator length is the smallest satisfying the accuracy conditions, then the process continues to step 108.

At step 108, the operator length determined in step 105 is placed into an operator table. For the 2D case, the operator length is preferably given by an operator half-length $L(k_\omega)$ and for the 3D case, the operator length is preferably given by the pair of operator half-lengths $L(k_\omega)$ and $M(k_\omega)$.

At step 109 it is determined if any wavenumbers $k_\omega$ of interest remain to be selected in step 104. If the answer is yes, wavenumbers $k_\omega$ of interest remain, then the process returns to step 104 to select another wavenumber $k_\omega$. If the answer is no, no wavenumbers $k_\omega$ of interest remain, then the process continues to step 110.

At step 110, the process ends. A table of explicit depth extrapolation operators with dynamically variable operator length has been constructed.

Figure 2:
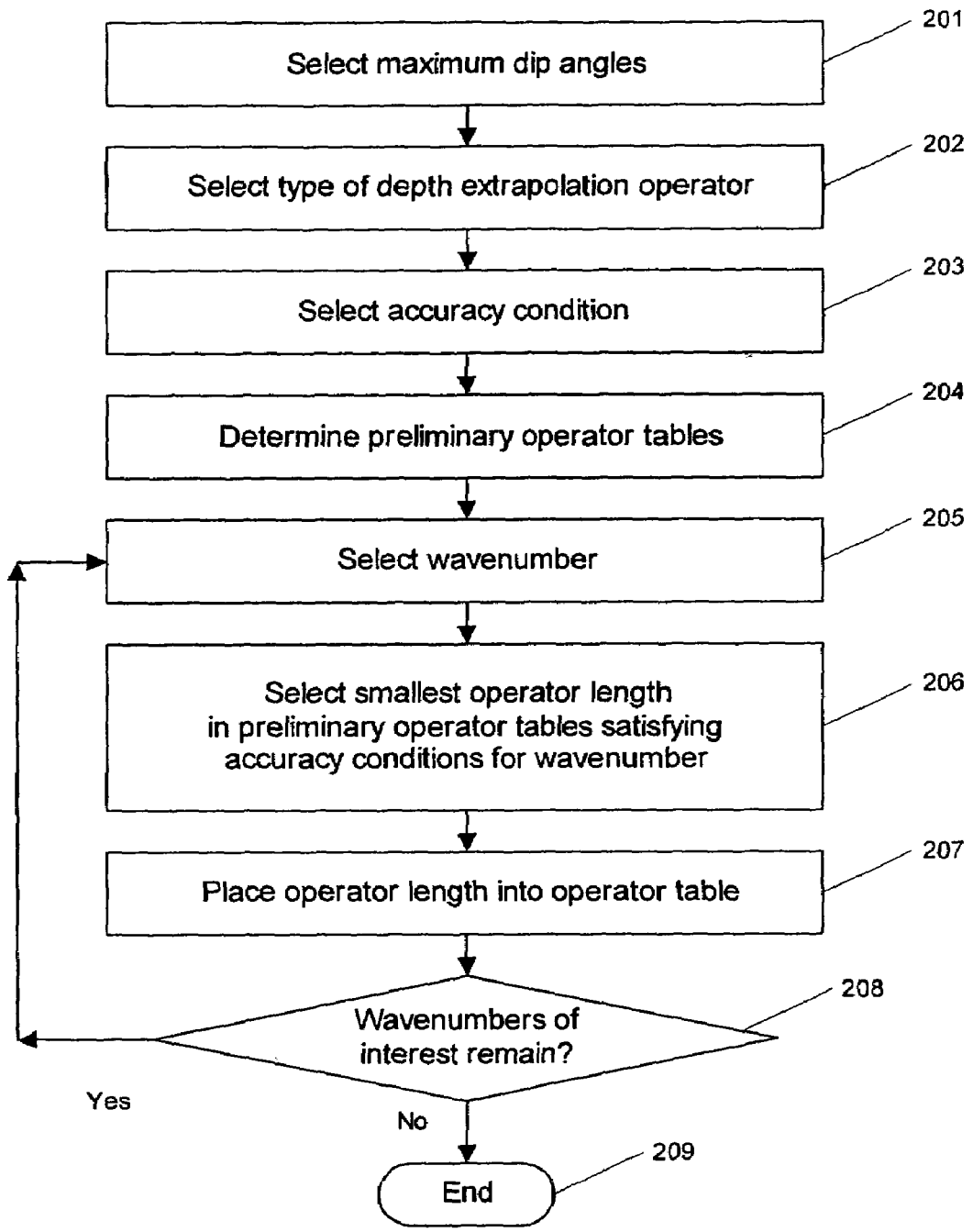
FIG. 2 is a flowchart illustrating the processing steps of a second embodiment of the method of the invention for constructing explicit depth extrapolation operators with dynamically variable operator length.

A second strategy for obtaining an operator table starts with designing a suite of operator tables with half-lengths ranging from minimum to maximum values of the half-lengths $L(k_\omega)$ or $M(k_\omega)$, that have an error that is as small as possible for each wavenumber $k_\omega$ value. Then, for each $k_\omega$ value; scan the wavenumber response of this suite of operator tables with a fixed error criterion and accept the operator that has the shortest half-length with an acceptable error. In this way, a single new operator table with variable operator half-lengths $L(k_\omega)$ and $M(k_\omega)$ is synthesized from a suite of fixed length operator tables. This strategy is illustrated in FIG. 2, which shows a flowchart illustrating the processing steps of a second embodiment of the method of the invention for constructing explicit depth extrapolation operators with dynamically variable operator length.

At step 201, a maximum dip angle to be accurately migrated is selected. Alternatively, maximum dip angles to be accurately migrated are selected in both the x-coordinate and y-coordinate directions. Typically, the x-coordinate and y-coordinate directions are the in-line and cross-line directions, respectively, of a seismic survey used to collect seismic data. Alternatively, maximum dip angles in all directions are selected.

At step 202, a type of explicit extrapolation operator for depth migration is selected. By way of example, but not of limitation, the method of the invention is applicable to the explicit extrapolation operators disclosed in the publications described above and any operators derived from or similar to the operators disclosed in these publications.

At step 203, accuracy conditions are selected for the maximum dip angles selected in step 201 and the type of explicit depth extrapolation operator selected in step 202. The accuracy conditions are selected to determine if the operator half-lengths, which determine the size of the explicit depth extrapolation operators, are sufficiently large.

The accuracy conditions are preferably selected as described with reference to step 103 of the flowchart in FIG. 1.

At step 204, preliminary operator tables are constructed for the operator type selected in step 202 with variable operator lengths ranging from possible minimum to maximum values. The preliminary operator tables are designed to have an error that is as small as possible for each wavenumber $k_\omega$ value. Thus, the accuracy conditions selected in step 203 yield a minimum error for each wavenumber $k_\omega$.

For the 2D case, as illustrated in Equation (11), the operator length is determined by operator half-length L. Thus, the preliminary operator tables are preferably constructed for operator half-lengths $L_{min}(k_\omega), \ldots, L_{max}(k_\omega)$ in the x-coordinate direction with smallest possible error for each $k_\omega$. For the 3D case, as illustrated in Equation (10), the operator length is determined by both operator half-lengths L and M. Thus, the preliminary operator tables are preferably constructed for operator half-lengths $L_{min}(k_\omega), \ldots, L_{max}(k_\omega)$ in the x-direction and operator half-lengths $M_{min}(k_\omega), \ldots, M_{max}(k_\omega)$ in the y-direction with smallest possible error for each $k_\omega$.

At step 205, a wavenumber $k_\omega$ is selected. The selection of the wavenumber $k_\omega$ is preferably done in a systematic manner, for computational efficiency, although systematic selection of the wavenumber $k_\omega$ is not a requirement of the invention. For example, a range of wavenumbers $k_\omega$ can be taken as going from a lowest wavenumber of interest, such as zero, to a highest wavenumber of interest, such as a Nyquist wavenumber Then, the selection of the wavenumbers $k_\omega$ can start with the lowest wavenumber of interest and proceed sequentially to the highest wavenumber of interest, or, inversely, proceed sequentially from the highest wavenumber of interest to the lowest wavenumber of interest.

At step 206, the smallest operator length satisfying the accuracy condition selected in step 203 for the wavenumber $k_\omega$ selected in step 205 is determined. The smallest operator length is determined by scanning the preliminary operator tables constructed in step 204. The smallest operator length is preferably determined in a systematic manner, for computational efficiency, although systematic determination of the operator lengths is not a requirement of the invention. For example, the determination of the smallest operator length can start with the minimum operator length and proceed sequentially upward to the maximum operator length in the preliminary operator tables for the selected wavenumber $k_\omega$. For the 2D case, the smallest operator length is preferably determined by proceeding sequentially upward through the operator half-lengths $L_{min}(k_\omega), \ldots, L_{max}(k_\omega)$. For the 3D case, the smallest operator length is preferably determined by proceeding sequentially upward through the pairs of operator half-lengths $L_{min}(k_\omega), \ldots, L_{max}(k_\omega)$ and $M_{min(k\omega)}, \ldots, M_{max}(k_\omega)$.

At step 207, the smallest operator length determined in step 205 is placed into an operator table. For the 2D case, the operator length is preferably given by the operator half-length $L(k_\omega)$ and for the 3D case, the operator length is preferably given by the pair of operator half-lengths $L(k_\omega)$ and $M(k_\omega)$.

At step 208, it is determined if any wavenumbers $k_\omega$ of interest remain to be selected in step 205. If the answer is yes, wavenumbers $k_\omega$ of interest remain, then the process returns to step 205 to select another wavenumber $k_\omega$. If the answer is no, no wavenumbers $k_\omega$ of interest remain, then the process continues to step 209.

At step 209, the process ends. A table of explicit depth extrapolation operators with dynamically variable operator length has been constructed.

In both embodiments as discussed with reference to FIGS. 1 and 2, an operator table is constructing that has variable operator half-lengths $L(k_\omega)$ and $M(k_\omega)$ depending on wavenumber $k_\omega$. For a fixed maximum propagation angle $\theta_{max}$ and a fixed numerical accuracy, the relation will be such that the operator half-length will increase with $k_\omega$.

Table 1 shows an example of how operator lengths L and M might vary for wavenumber $k_\omega$ for a constrained extrapolation operator with maximum propagation angle of 65 degrees.

TABLE 1

| $k_\omega$ | L = M |
|---|---|
| $0 \leq k_\omega < 0.05\ \pi$ | 6 |
| $0.05\ \pi \leq k_\omega < 0.10\ \pi$ | 7 |
| $0.10\ \pi \leq k_\omega < 0.65\ \pi$ | 8 |
| $0.65\ \pi \leq k_\omega < 0.75\ \pi$ | 9 |
| $0.75\ \pi \leq k_\omega < 0.82\ \pi$ | 10 |
| $0.82\ \pi \leq k_\omega < 0.88\ \pi$ | 12 |
| $0.88\ \pi \leq k_\omega < 0.94\ \pi$ | 16 |
| $0.94\ \pi \leq k_\omega < \pi$ | 20 |

The actual wavenumber intervals in Table 1 would typically vary, depending on such factors as operator type, maximum dip angles, and accuracy conditions. However, a general trend is that an operator with a short half-length can be used for wavenumber values up to 70 to 80 percent of the Nyquist wavenumber. Variable length operator tables require a scan of the velocity model before the start of wave extrapolation. This is not numerically costly and has to be performed only once, independent of how many frequencies there are to extrapolate. The simplest procedure is to determine the lowest propagation velocity at each depth level. Explicit depth extrapolation is performed for one $\omega$ value at the time. For a given depth level z, when the angular frequency $\omega$ and the lowest propagation velocity $c_{min}(z)$ are known, the highest wavenumber $k_\omega^{max}(z)$ for this depth level z is given by:

$$k_\omega^{max}(z) = \frac{\omega}{c_{min}(z)} \quad (13)$$

Thus, the required maximum extrapolation operator half-lengths $L(k_\omega)$ and $M(k_\omega)$ are known for this depth step $\Delta z$. Here, the source of the gain in computer efficiency is apparent. First, for small and intermediate values of frequency $\omega$, high numerical accuracy can be retained with an extrapolation operator with short half-lengths $L(k_\omega)$ and $M(k_\omega)$. Second, in high velocity zones, as, for example, in salt, the highest wavenumber $k_\omega^{max}(z)$ will be small due to the high value for the minimum propagation velocity $c_{min}(z)$. Again, high accuracy and high dip wave extrapolation can be performed with relatively short extrapolation operator half-lengths.

A refinement of the method of the invention is to divide each depth plane z into several sub-domains D. Instead of determining the lowest propagation velocity $c_{min}(z)$ for the entire depth plane z, determine the lowest propagation velocity $c_{min}(D, z)$ for each sub-domain D within the depth plane z. Then, as in Equation (13), the highest wavenumber $k_\omega^{max}(D, z)$ for this sub-domain D within the depth level z is given for a angular frequency $\omega$ by:

$$k_\omega^{max}(D, z) = \frac{\omega}{c_{min}(D, z)} \quad (14)$$

This gives an additional gain in efficiency, since a relatively shorter operator is being used in those sub-domains that have an overall high propagation velocity.

Now, if a node $(x_i, y_j, z)$ is in the domain D at the depth z, then 3D explicit depth extrapolation can now be implemented by using Equation (14) with Equation (10), yielding:

$$P(x_i, y_j, \omega, z+\Delta z) = \sum_{l=-L(k_\omega^{max}(D,z))}^{L(k_\omega^{max}(D,z))} \sum_{m=-M(k_\omega^{max}(D,z))}^{M(k_\omega^{max}(D,z))} W(x_l, y_m, k_\omega(x_i, y_j, z), \Delta z) P(x_i - x_l, y_j - y_m, \omega, z). \quad (15)$$

Similarly, 2D explicit depth extrapolation can now be implemented by using Equation (14) with Equation (11), yielding:

$$P(x_i, \omega, z+\Delta z) = \sum_{l=-L(k_\omega^{max}(D,z))}^{L(k_\omega^{max}(D,z))} W(x_l, k_\omega(x_i, z), \Delta z) P(x_i - x_l, \omega, z). \quad (16)$$

Further, explicit depth extrapolation can now be implemented for the Hale-McClellan approach, as discussed above for Hale (1991), Soubaras (1992, 1996), and Sollid, A., and Arntsen, B. (1994), by using Equation (14) with Equation (12), yielding:

$$P(x_i, y_j, \omega, z+\Delta z) = \sum_{l=0}^{L(k_\omega^{max}(D,z))} W_l(k_\omega(x_i, y_j, z), \Delta z) h_l(x_i, y_j, \omega, z) \quad (17)$$

Figure 3:
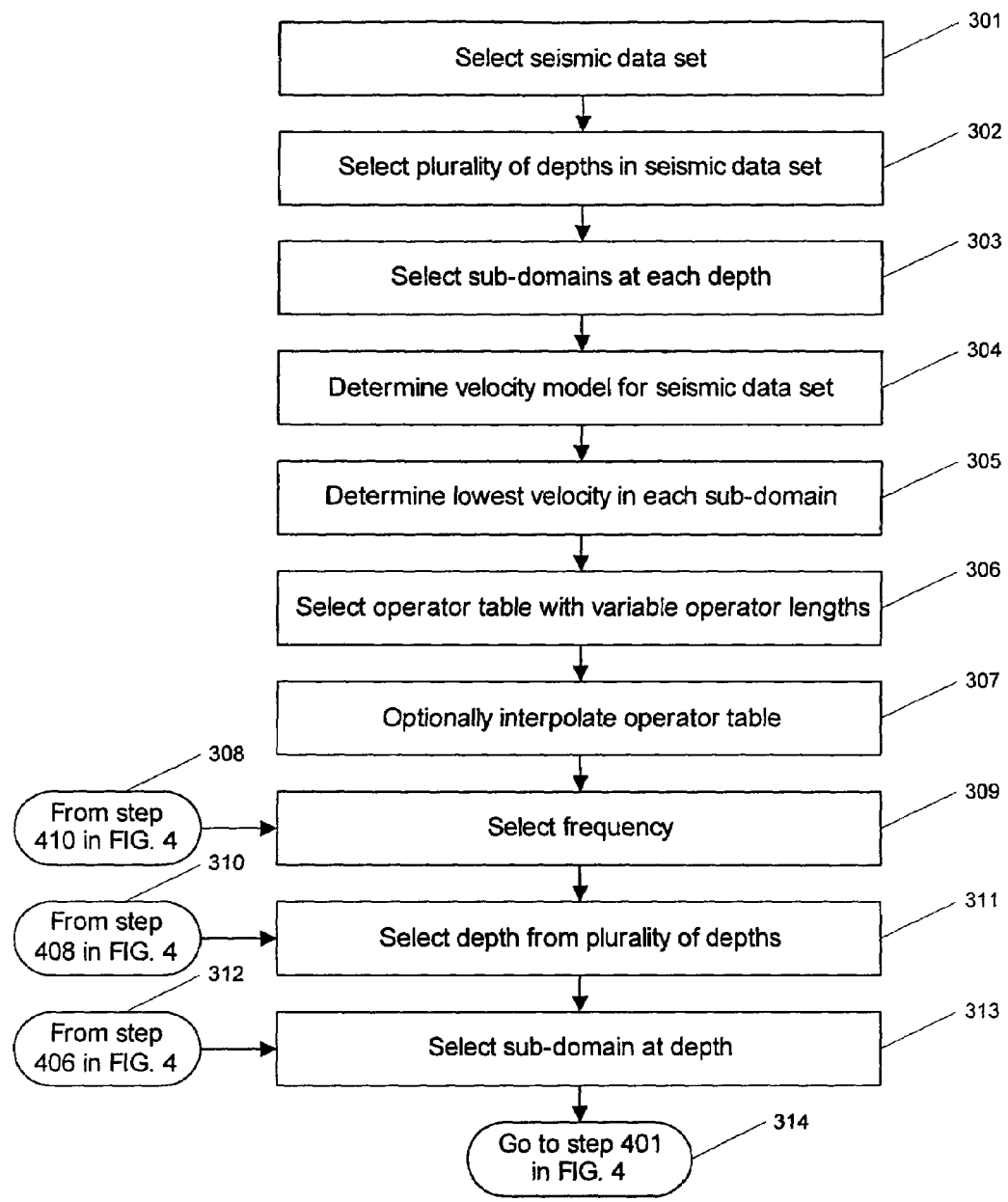
FIG. 3 is a flowchart illustrating the initial processing steps for utilizing tables of explicit depth extrapolation operators with dynamically variable operator length, as continued in FIG. 4.
Figure 4:
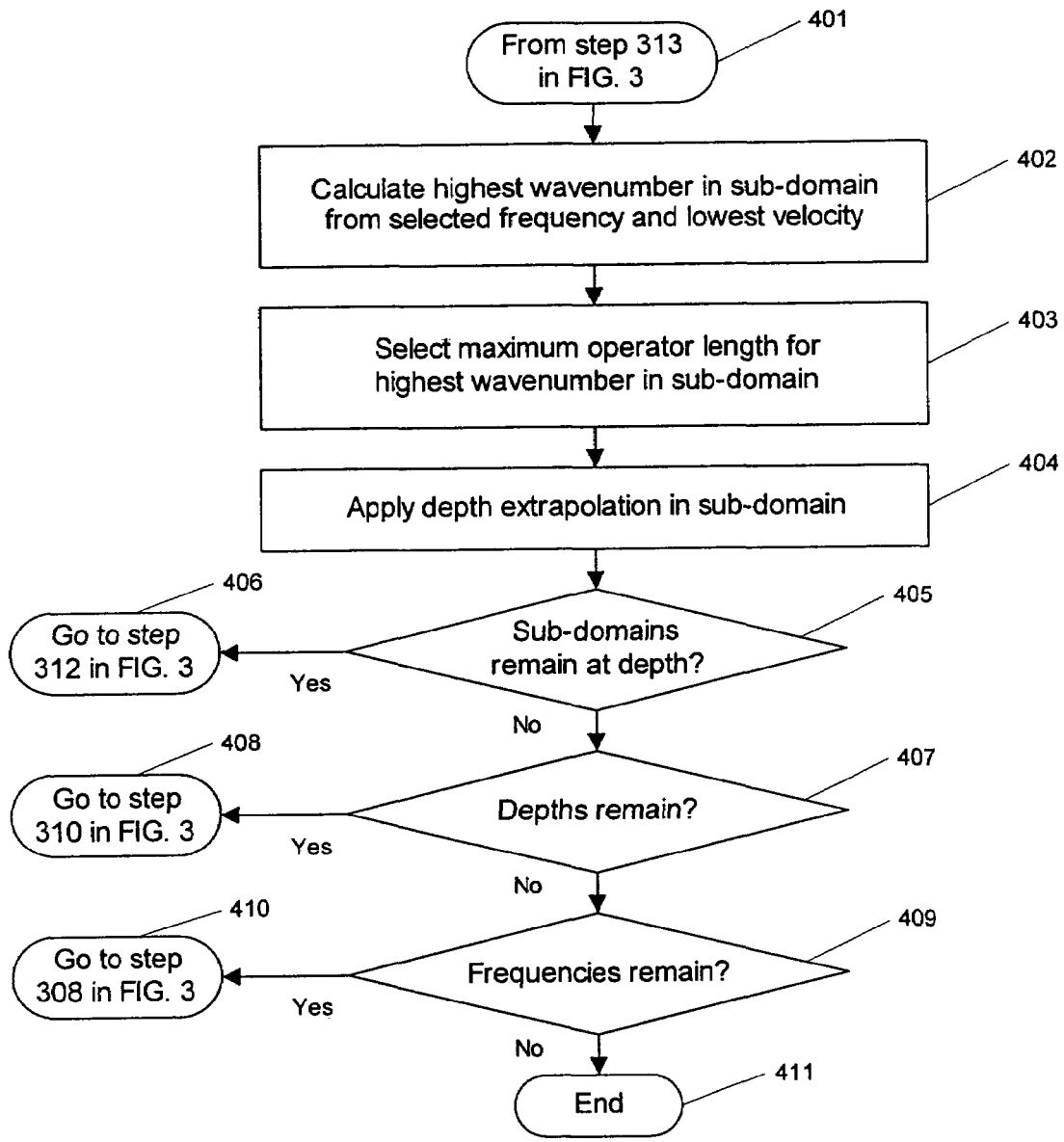
FIG. 4 is a flowchart illustrating the final processing steps for utilizing tables of explicit depth extrapolation operators with dynamically variable operator length, as continued from FIG. 3.

FIGS. 3 and 4 show two flowcharts illustrating the processing steps for seismic migration utilizing tables of explicit depth extrapolation operators with dynamically variable operator length. The operator tables are obtained by the method of the invention, preferably by one of the embodiments described with reference to the flowcharts in FIGS. 1 and 2. FIG. 3 shows a flowchart illustrating the initial processing steps, to be continued in FIG. 4.

At step 301, a seismic data set suitable for depth migration is selected. The seismic data set is preferably represented in the space-frequency domain, having been transformed from the space-time domain, if necessary, by a temporal Fourier transform.

At step 302, a plurality of depths z are selected in the seismic data set selected in step 301. Each depth z represents a depth interval in the seismic data set. The plurality of depths z are selected in a systematic manner, starting at the top of the seismic data set and proceeding sequentially downward, interval by interval.

At step 303, a plurality of sub-domains D are selected at each depth z in the plurality of depths z selected in step 302 in the seismic data set selected in step 301. Consideration of sub-domains D at each depth z gives flexibility to the invention. Nonetheless, in an alternative embodiment of the method of the invention, sub-domains D at each depth z are not considered. For completeness and clarity, the process will be illustrated by the embodiment containing sub-domains, but the extension to the embodiment not containing sub-domains is straightforward.

At step 304, a velocity model is determined for the seismic data set selected in step 301. The velocity model determines the local velocities c(x, y, z) for the plurality of depths z selected in step 302 and the sub-domains D selected in step 303. The velocity model may be determined by any means known in the art.

At step 305, a lowest velocity $c_{min}(D, z)$ is determined for each sub-domain D selected in step 303 at each depth z. The determination of the lowest velocity $c_{min}(D, z)$ in each sub-domain D is preferably done by scanning the velocity model determined in step 303. In an alternative embodiment of the method of the invention, sub-domains D at each depth z are not considered. A lowest velocity $c_{min}(z)$ is determined only at each depth z in the plurality of depths z selected in step 302, by scanning the velocity model determined in step 303. For completeness and clarity, the process will be illustrated by the embodiment containing sub-domains, but the extension to the embodiment not containing sub-domains is straightforward.

At step 306, a table of explicit depth extrapolation operators with dynamically variable operator lengths is selected for the seismic data set selected in step 301. The table is preferably constructed by the method of the invention, particularly by one of the embodiments described with reference to the flowcharts in FIGS. 1 and 2. For the 2D case, the operator length is preferably given by an operator half-length $L(k_\omega)$ and for the 3D case, the operator length is preferably given by a pair of operator half-lengths $L(k_\omega)$ and $M(k_\omega)$.

The table of explicit extrapolation operators may be designed by any means known in the art. In particular, the method of the invention is applicable to the methods disclosed in the publications described above and any methods derived from or similar to the methods disclosed in those publications.

At step 307, the table of explicit depth extrapolation operators with dynamically variable operator lengths selected in step 306 is optionally interpolated, if necessary, for the seismic data set selected in step 301. Interpolation allows reasonably sized operator tables to be constructed, stored, and reused. The interpolation can then be designed for the particular seismic data set velocity model used and accuracy conditions desired.

At step 308, the process returns from step 410 in FIG. 4, if necessary, to select another frequency ω.

At step 309, a frequency ω is selected for the seismic data set selected in step 301. The selection of the frequencies ω is preferably done in a systematic manner, for computational efficiency, although systematic selection of the frequencies ω is not a requirement of the invention. For example, the selection of the frequencies ω can start with the lowest frequency of interest and proceed sequentially to the highest frequency of interest, or, inversely, proceed sequentially from the highest frequency of interest to the lowest frequency of interest.

At step 310, the process returns from step 408 in FIG. 4, if necessary, to select another depth z.

At step 311, a depth z is selected from the plurality of depths z selected in step 302. The selection of the depth z is done in a systematic manner, appropriate for downward depth extrapolation. Thus, the depth z is selected starting at the top of the seismic data set selected in step 301 and proceeding sequentially downward.

At step 312, the process returns from step 406 in FIG. 4, if necessary, to select another sub-domain D.

At step 313, a sub-domain D is selected at the depth z selected in step 311 from the sub-domains selected in step 303. The selection of the sub-domains D is preferably done in a systematic manner, for computational efficiency, although systematic selection of the sub-domains D is not a requirement of the invention. For example, the selection of the sub-domains D can start at one side of the depth interval represented by the depth z and proceed sequentially to the other side.

At step 314, the process continues to step 401 in FIG. 4.

FIG. 4 shows a flowchart illustrating the final processing steps for utilizing tables of explicit depth extrapolation operators with dynamically variable operator length, as continued from FIG. 3.

At step 401, the process continues from step 314 in FIG. 3.

At step 402, a highest wavenumber $k_\omega^{max}(D, z)$ is calculated for the sub-domain D selected in step 313 of FIG. 3. The highest wavenumber $k_\omega^{max}(D, z)$ is calculated for the frequency ω selected in step 309 of FIG. 3 and using the lowest velocity $c_{min}(D, z)$ determined in step 305 of FIG. 3. The calculation of the highest wavenumber $k_\omega^{max}(D, z)$ is preferably by division of the frequency ω by the lowest velocity $c_{min}(D, z)$, as in Equation (14).

At step 403, a maximum operator length is selected for the sub-domain selected in step 313 of FIG. 3. The maximum operator length is selected on the basis of the highest wavenumber $k_\omega^{max}(D, z)$ calculated in step 402. In the 2D case, the operator length is preferably selected as the operator half-length $L(k_\omega)$ corresponding to the highest wavenumber $k_\omega^{max}(D, z)$. In the 3D case, the operator length is preferably selected as the pair of operator half-lengths $L(k_\omega^{max}(D, z))$ and $M(k_\omega^{max}(D, z))$ corresponding to the highest wavenumber $k_\omega^{max}(D, z)$.

At step 404, explicit depth extrapolation is applied in the sub-domain selected in step 313 of FIG. 3. Explicit depth operators are selected from the table of explicit depth extrapolation operators with dynamically variable operator lengths selected in step 306 of FIG. 3. The explicit depth extrapolation operators are selected to have no more than the maximum operator length selected in step 403.

At step 405, it is determined if any sub-domains D of interest remain within the depth z selected in step 311 in FIG. 3. If the answer is yes, a sub-domain D of interest remains, then the process proceeds to step 406, to select another sub-domain D. If the answer is no, no sub-domain D of interest remains, then the process continues to step 407, to check the depths z.

At step 406, the process returns to step 312 in FIG. 3 to select another sub-domain D.

At step 407, it is determined if any depths z of interest remain within the seismic data set selected in step 307 in FIG. 3. If the answer is yes, a depth z of interest remains, then the process proceeds to step 408, to select another depth z. If the answer is no, no depth z of interest remains, then the process continues to step 409, to check the frequencies ω.

At step 408, the process returns to step 310 in FIG. 3 to select another depth z.

At step 409, it is determined if any frequencies ω of interest remain for the domain D selected in step 312 in FIG. 3. If the answer is yes, a frequency ω of interest remains, then the process proceeds to step 410, to select another frequency ω. If the answer is no, no frequency ω of interest remains, then the process continues to step 411, to end.

At step 410, the process returns to step 308 in FIG. 3 to select another frequency ω.

At step 411, the process ends.

The invention is used for 2D and 3D table driven depth extrapolation with optimized space-frequency domain operators. The effective number of extrapolation operator coefficients varies dynamically as a function of the maximum ratio of frequency to propagation-velocity at a depth level or, alternatively, within a sub-domain of that depth level. Use of the invention increases computer efficiency for explicit depth extrapolation schemes, while maintaining accuracy and stability.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for seismic data processing, comprising:
   constructing explicit depth extrapolation operators with variable operator lengths depending on maximum dip angle, accuracy condition, and wavenumber;
   constructing operator tables using the explicit depth extrapolation operator having the smallest operator length satisfying the accuracy condition at the maximum dip angle for each of a plurality of wavenumbers; and
   performing depth migration using the explicit depth extrapolation operator in a sub-domain at a depth having the smallest operator length from the operator tables for the highest wavenumber in the sub-domain at the depth.

2. The method of claim 1, wherein the step of constructing operator tables comprises:
   selecting a maximum dip angle;
   selecting a type of operator;
   selecting an accuracy condition for the type of operator;
   selecting a plurality of wavenumbers; and
   performing the following steps for each of the plurality of wavenumbers:
      selecting a plurality of operator lengths for the selected wavenumber; and
      performing the following steps for each of the plurality of operator lengths:
         determining if the selected type of operator with the selected operator length satisfies the selected accuracy condition at the selected maximum dip angle at the selected wavenumber;
         determining if the operator length is the smallest operator length satisfying the accuracy condition at the selected maximum dip angle for the selected wavenumber; and
         storing the operator length in an operator table if the operator length is the smallest operator length satisfying the accuracy condition at the maximum dip angle for the selected wavenumber.

3. The method of claim 2, wherein the steps performed for each wavenumber comprise:
   selecting a plurality of pairs of first operator half-lengths and second operator half-lengths for the selected wavenumber; and
   performing the following steps for each of the plurality of pairs of first operator half-lengths and second operator half-lengths:
      determining if the selected type of operator with the selected pair of first operator half-length and second operator half-length satisfies the selected accuracy condition at the selected maximum dip angle at the selected wavenumber;
      determining if the first operator half-length is the smallest first operator half-length satisfying the accuracy condition for the selected wavenumber and the second operator half-length is the smallest second operator half-length satisfying the accuracy condition for the selected wavenumber; and
      storing the pair of first operator half-length and second operator half-length in an operator table if the first operator half-length is the smallest first operator half-length satisfying the accuracy condition for the selected wavenumber and the second operator half-length is the smallest second operator half-length satisfying the accuracy condition at the selected maximum dip angle for the selected wavenumber.

4. The method of claim 1, wherein the step of constructing operator tables comprises:
   selecting a maximum dip angle;
   selecting a type of operator;
   selecting an accuracy condition for the type of operator;
   determining preliminary operator tables with variable operator lengths;
   selecting a plurality of wavenumbers; and
   performing the following steps for each of the plurality of wavenumbers:
      selecting a smallest operator length in the preliminary operator tables satisfying the accuracy condition for the selected wavenumber; and
      storing the smallest operator length in an operator table.

5. The method of claim 4, wherein the steps performed for each wavenumber comprise:
   selecting a pair of smallest first operator half-length and smallest second operator half-length in the preliminary operator tables satisfying the accuracy condition for the selected wavenumber; and
   storing the pair of smallest first operator half-length and smallest second operator half-length in an operator table.

6. The method of claim 1, wherein the step of performing depth migration comprises:
   selecting a seismic data set;
   selecting a plurality of depths in the seismic data set;
   selecting sub-domains for each of the plurality of depths;
   determining a velocity model for the seismic data set and the plurality of depths;
   determining a lowest velocity for each sub-domain from the velocity model;
   selecting an operator table with variable operator lengths;
   selecting a plurality of frequencies in the selected sub-domain; and
   performing the following steps for each of the plurality of frequencies:
      performing the following steps for each of the plurality of depths:

performing the following steps for each of the sub-domains at the depth:
calculating a highest wavenumber in the sub-domain from the frequency and the lowest velocity for the sub-domain;
selecting a maximum operator length for the calculated highest wavenumber from the operator table;
applying operators from the operator table with operator lengths no greater than the maximum operator length to the selected sub-domain.

7. The method of claim 6, wherein the operator table with variable operator lengths comprises explicit extrapolation operators with variable operator lengths.

8. The method of claim 6, wherein the step of selecting an operator table with variable operator lengths further comprises:
interpolating the operator table with variable operator lengths.

9. The method of claim 6, wherein each operator length comprises a pair of first operator half-length and second operator half-length.

10. The method of claim 2, wherein the step of selecting a type of operator comprises applying the following formula:

$$P(x_i, y_j, \omega, z + \Delta z) = \sum_{l=-L(k_\omega^{max}(D,z))}^{L(k_\omega^{max}(D,z))} \sum_{m=-M(K_\omega^{max}(D,z))}^{M(K_\omega^{max}(D,z))} W(x_l, y_m, k_\omega(x_i, y_j, z), \Delta z) P(x_i - x_l, y_j - y_m, \omega, z),$$

where $P(x_i, y_j, \omega, z+\Delta z)$ is a seismic wavefield at lateral location $x_i = i \cdot \Delta x$, $y_j = j \cdot \Delta y$, and depth $z+\Delta z$; $\omega$ is angular frequency; $P(x_i, y_j, \omega, z)$ is a seismic wavefield in a sub-domain D at depth z; $\Delta x$, $\Delta y$, and $\Delta z$ are step lengths in the x-, y- and z-coordinate directions, respectively; $L(k_\omega^{max}(D, z))$ and $M(k_\omega^{max}(D, z))$ are operator half-lengths in the x- and y-coordinate directions, respectively, for the highest wavenumber $k_\omega^{max}(D, z)$ in the sub-domain D at depth z; $W(x_i, y_j, k_\omega(x_i, y_j, z), \Delta z)$ is an explicit depth extrapolation operator; and $k_\omega(x_i, y_j, z)$ is a local wavenumber.

11. The method of claim 10, wherein the wavenumber $k_\omega(x_i, y_j, z)$ is given by the formula:

$$k_\omega(x_i, y_j, z) = \frac{\omega}{c(x_i, y_j, z)},$$

where $c(x_i, y_j, z)$ is a local propagation velocity.

12. The method of claim 10, wherein the highest wavenumber $k_\omega^{max}(D, z)$ for a frequency $\omega$ for a sub-domain D at depth z is given by the formula:

$$k_\omega^{max}(D, z) = \frac{\omega}{c_{min}(D, z)},$$

where $c_{min}(D, z)$ is the lowest velocity for the sub-domain D at depth z.

13. The method of claim 2, wherein the step of step of selecting a type of operator comprises applying the following formula:

$$P(x_i, \omega, z + \Delta z) = \sum_{l=-L(k_\omega^{max}(D,z))}^{L(K_\omega^{max}(D,z))} W(x_l, k_\omega(x_i, z), \Delta z) P(x_i - x_l, \omega, z),$$

where $P(x_i, y_j, z+\Delta z)$ is a seismic wavefield at lateral location $x_i = i \cdot \Delta x$ and depth $z+\Delta z$, $\omega$ is angular frequency, $P(x_i, \omega, z)$ is a seismic wavefield in a sub-domain D at depth z, $\Delta x$ and $\Delta z$ are step lengths in the x- and z-coordinate directions, respectively, $L(k_\omega^{max}(D, z))$ is an operator half-length in the x-coordinate direction for the highest wavenumber $k_\omega^{max}(D, z)$ in the sub-domain D at depth z; $W(x_l, k_\omega(x_i, z), \Delta z)$ is an explicit depth extrapolation operator, and $k_\omega(x_i, z)$ is a local wavenumber.

14. The method of claim 13, wherein the wavenumber $k_\omega(x_i, z)$ is given by the formula:

$$k_\omega(x_i, z) = \frac{\omega}{c(x_i, z)},$$

where $c(x_i, z)$ is a local propagation velocity.

15. The method of claim 2, wherein the step of selecting a type of operator comprises applying the following formula:

$$P(x_i, y_j, \omega, z + \Delta z) = \sum_{l=0}^{L(k_\omega^{max}(D,z))} W_l(k_\omega(x_i, y_j, z), \Delta z) h_l(x_i, y_j, \omega, z),$$

where $P(x_i, y_j, \omega, z+\Delta z)$ is a seismic wavefield at lateral location $x_i = i \cdot \Delta x$, $y_j = j \cdot \Delta y$, and depth $z+\Delta z$; $\omega$ is angular frequency; $P(x_i, y_j, \omega, z)$ is a seismic wavefield in a sub-domain D at depth z; $\Delta x$, $\Delta y$, and $\Delta z$ are step lengths in the x-, y- and z-coordinate directions, respectively; $L(k_\omega^{max}(D, z))$ is an operator length for the highest wavenumber $k_\omega^{max}(D, z)$ in the sub-domain D at depth z; $W_l(k_\omega(x_i, y_j, z), \Delta z)$ is an explicit depth extrapolation operator expressed in cylindrical coordinates; $k_\omega(x_i, y_j, z)$ is a local wavenumber; and $h_l(x_i, y_j, \omega, z)$ are auxiliary fields resulting from applying recursive 2D Chebyshev filters to the seismic wavefield $P(x_i, y_j, \omega, z)$.

* * * * *